(12) United States Patent
Favart et al.

(10) Patent No.: US 7,880,749 B2
(45) Date of Patent: Feb. 1, 2011

(54) APPARATUS AND METHOD FOR DATA CHARTING WITH AN EXTENSIBLE VISUALIZATION LIBRARY

(75) Inventors: Christophe Favart, Ermont (FR); Marc Labouze, Masons-Alfort (FR); Bruno Plumejeau, Courbevoie (FR)

(73) Assignee: Business Objects Software Ltd., Dublin (IE)

( * ) Notice: Subject to any disclaimer, the term of this patent is extended or adjusted under 35 U.S.C. 154(b) by 486 days.

(21) Appl. No.: 11/669,856

(22) Filed: Jan. 31, 2007

(65) Prior Publication Data

US 2008/0180458 A1    Jul. 31, 2008

(51) Int. Cl.
   *G09G 5/00*   (2006.01)
(52) U.S. Cl. .................. 345/619; 345/440; 345/440.1; 345/440.2
(58) Field of Classification Search .................. None
   See application file for complete search history.

(56) References Cited

U.S. PATENT DOCUMENTS

| | | | |
|---|---|---|---|
| 6,995,768 B2 | 2/2006 | Jou et al. | |
| 7,149,698 B2 | 12/2006 | Guheen et al. | |
| 7,231,593 B1* | 6/2007 | Raja et al. | 715/210 |
| 2003/0058277 A1 | 3/2003 | Bowman-Amuah | |
| 2005/0121557 A1 | 6/2005 | Futschek | |
| 2005/0193425 A1 | 9/2005 | Sull et al. | |
| 2006/0112123 A1 | 5/2006 | Clark et al. | |
| 2007/0220415 A1* | 9/2007 | Cheng et al. | 715/503 |
| 2007/0245238 A1* | 10/2007 | Fugitt et al. | 715/700 |

OTHER PUBLICATIONS

International Search Report and Written Opinion for International Application No. PCT/US2008/052163, mailed on Jul. 14, 2008, 6 pages.

* cited by examiner

*Primary Examiner*—Xiao M Wu
*Assistant Examiner*—Jwalant Amin
(74) *Attorney, Agent, or Firm*—Cooley LLP

(57) ABSTRACT

A computer readable storage medium includes executable instructions to define an abstraction layer disposed between a business intelligence application and a set of visualization libraries. The abstraction layer provides an application programmer interface for the business intelligence application to the set of visualization libraries. A visualization settings model is defined within the abstraction layer. The visualization settings model describes a visualization that can be rendered by a visualization library in the of visualization libraries.

25 Claims, 7 Drawing Sheets

APPARATUS AND METHOD FOR DATA CHARTING WITH AN EXTENSIBLE VISUALIZATION LIBRARY

BRIEF DESCRIPTION OF THE INVENTION

The present invention relates generally to data processing. More particularly, the present invention relates to a technique for efficiently creating visualizations for data.

BACKGROUND OF THE INVENTION

Business Intelligence (BI) generally refers to software tools used to improve business enterprise decision-making. These tools are commonly applied to financial, human resource, marketing, sales, customer and supplier analyses. More specifically, these tools can include: reporting and analysis tools to present information; content delivery infrastructure systems for delivery and management of reports and analytics; data warehousing systems for cleansing and consolidating information from disparate sources; and data management systems, such as relational databases or On Line Analytic Processing (OLAP) systems used to collect, store, and manage raw data.

A subset of the BI tools are reporting tools. There are a number of commercially available products to produce reports from stored data. For instance, Business Objects Americas of San Jose, Calif., sells a number of widely used report generation products, including Crystal Reports™, Business Objects OLAP Intelligence™, Business Objects Web Intelligence™, and Business Objects Enterprise™. As used herein, the term report refers to information automatically retrieved (i.e., in response to computer executable instructions) from a data source (e.g., a database, a data warehouse, a plurality of reports, and the like), where the information is structured in accordance with a report schema that specifies the form in which the information should be presented. A non-report is an electronic document that is constructed without the automatic retrieval of information from a data source. Examples of non-report electronic documents include typical business application documents such as a word processor document, a presentation document and the like.

A report document specifies how to access data and format it. A report document where the content does not include external data, either saved within the report or accessed live, is a template document for a report rather than a report document. Unlike other non-report documents that may optionally import external data within a document, a report document by design is primarily a medium for accessing and formatting, transforming or presenting external data.

A report is specifically designed to facilitate working with external data sources. In addition to information regarding external data source connection drivers, the report may specify advanced filtering of data, information for combining data from different external data sources, information for updating join structures and relationships in report data, and logic to support a more complex internal data model (that may include additional constraints, relationships, and metadata).

In contrast to a spreadsheet, a report is generally not limited to a table structure but can support a range of structures, such as sections, cross-tables, synchronized tables, sub-reports, hybrid charts, and the like. A report is designed primarily to support imported external data, whereas a spreadsheet equally facilitates manually entered data and imported data. In both cases, a spreadsheet applies a spatial logic that is based on the table cell layout within the spreadsheet in order to interpret data and perform calculations on the data. In contrast, a report is not limited to logic that is based on the display of the data, but rather can interpret the data and perform calculations based on the original (or a redefined) data structure and meaning of the imported data. The report may also interpret the data and perform calculations based on pre-existing relationships between elements of imported data. Spreadsheets generally work within a looping calculation model, whereas a report may support a range of calculation models. Although there may be an overlap in the function of a spreadsheet document and a report document, these documents express different assumptions concerning the existence of an external data source and different logical approaches to interpreting and manipulating imported data.

BI tools, including reporting tools, include visualizations. There are known techniques for graphically portraying quantitative information used in the fields of statistical graphics, data visualization, and the like. Charts, tables, and maps are types of visualizations. These can be produced by so called visualization libraries. A visualization library contains executable instructions to render one or more visualizations Some BI tools make use of visualization libraries, for instance to include visualizations in a report.

Existing BI tools have limitations with respect to visualizations. One limitation is that the choice of visualization library is hard coded into the executable instructions of the BI tool. Switching visualization libraries becomes difficult. Therefore, it is expensive for BI tool creators to switch visualization libraries. Another limitation is that the choice of visualization is hard coded. As visualization libraries are used for many purposes, visualization libraries contain little or no logic to aid chart selection. Even fewer visualization libraries have chart selection logic influenced by BI. Chart selection logic is the ability to select a chart given a data set.

Therefore, it would be desirable to provide new techniques for incorporating visualization libraries in BI tools and other applications. In addition, it would be desirable to provide new techniques for selecting visualizations within BI tools.

SUMMARY OF THE INVENTION

The invention includes a computer readable storage medium with executable instructions to define an abstraction layer disposed between a business intelligence application and a set of visualization libraries. The abstraction layer provides an application programmer interface for the business intelligence application to the set of visualization libraries. A visualization settings model is defined within the abstraction layer. The visualization settings model describes a visualization that can be rendered by a visualization library in the of visualization libraries.

A computer readable storage medium includes executable instructions to define a setting model for a visualization, a definition to the setting model, and a value for a setting in the setting model. An instance of the visualization incorporating the value for the setting is rendered.

BRIEF DESCRIPTION OF THE DRAWINGS

The invention is more fully appreciated in connection with the following detailed description taken in conjunction with the accompanying drawings in which.

Like reference numerals refer to corresponding parts throughout the several views of the drawings.

DETAILED DESCRIPTION OF THE INVENTION

Figure 1:
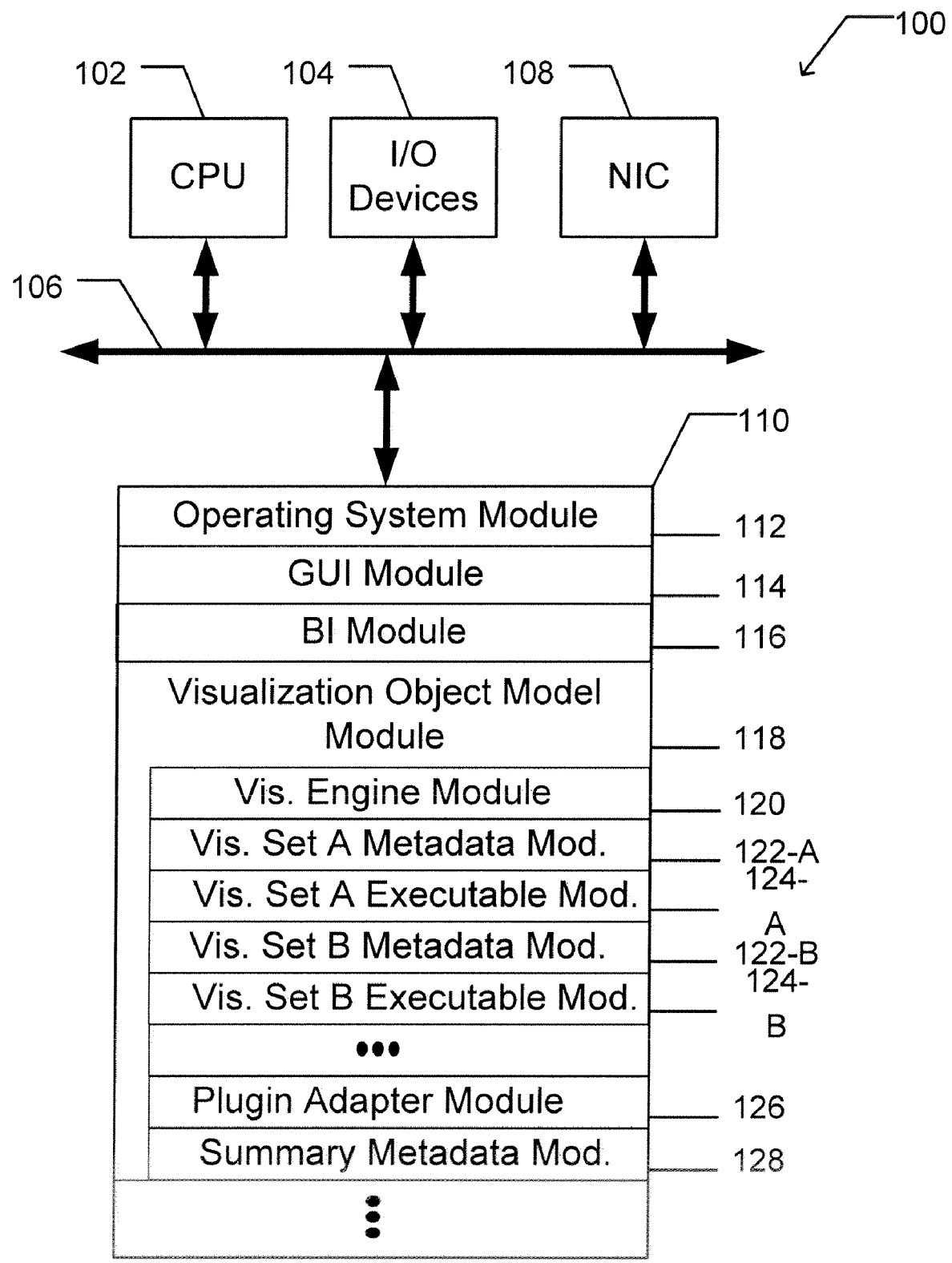
FIG. 1 illustrates a computer that may be operated in accordance with an embodiment of the invention.

The following terminology is used while disclosing embodiments of the invention:

Chart. A chart includes a collection of visual elements used to convey information. A chart is visualization.

Dimension. A dimension is a line in a real or abstract space. An example of a real space dimension is a pair of antiparallel cardinal points on a compass, e.g., North and South, Northnorthwest and South-southeast. Another real dimension is time. An example of an abstract space dimension is a list of stores. The dimension is abstract because the list can be ordered alphabetically by name, by store number, by distance from head office, etc. Examples of dimensions include region, store, year, customer, employee, product line, and the like. Dimensions can be hierarchical in nature: year, quarter, month, day, and the like.

Family. A family is a group of similar or related things. Visualizations can be grouped into families. Charts can be grouped into families. Families of charts include, but are not limited to: status charts; variation charts; contribution comparison charts; rank compare charts; times series charts; frequency distribution charts; correlation charts: combination charts; and other charts. Examples of families include those described in the following pending, commonly owned patent application which is incorporated by reference herein in its entirety: Ser. No. 11/478,836 filed Jun. 28, 2006, entitled "Apparatus and Method for Visualizing Data".

Map. A map is a simplified depiction of a space that highlights relations between elements in the space. Thus, a map is a visualization. Typically, a map is a two-dimensional, geometrically accurate representation of a space. A map is not limited to a two dimensional cartographic map. A map can be augmented to include extra information presented in the form of an added dimension, e.g., height, color, density. A map may include other visualizations in regions of the map, e.g., a map with pie charts in each region.

Measure. A measure is a quantity as ascertained by comparison with a standard, usually denoted in some unit, e.g., units sold, dollars. A measure, such as revenue, can be displayed for the dimension "Year", which is in effect the aggregation of all revenue for all years. Corresponding measures can also be displayed for each of the values within a dimension. Region of focus is either set by default or definable by a user event. The user event includes the user clicking on an area of a table, chart, map or portion therefore which displays quantitative information. The user can select one or more: charts, maps, columns or rows in a table, axes or data within a chart, data in a time series, or regions in a map. Alternatively, the user event can include the user specifying a parameter to a report document. The region of focus is an area of the report which the user wishes to explore.

Table. A table maps the logical structure of a set of data into a series of columns or rows. Thus, a table is a visualization. To facilitate representation in two dimensions, higher-dimensional tables of data are often represented in an exploded view comprising a plurality of two dimensional tables. A table can be rectangular, triangular, octagonal, etc. A table can have row and column headings, where each cell in a table can show the value associated with the specific combination of row and column headings. Some tables can hold charts or maps in their cells; this is a spatially economic way to display many charts with common axes. A table is to be conceptually differentiated from a database table.

Visualization. A visualization is a graphic display of quantitative information. Types of visualizations include charts, tables, and maps.

FIG. 1 illustrates a computer 100 configured in accordance with an embodiment of the invention. The computer 100 includes standard components, including a central processing unit 102 and input/output devices 104, which are linked by a bus 106. The input output devices 104 may include a keyboard, mouse, touch screen, monitor, printer, and the like. A network interface circuit 08 is also connected to the bus 106. The network interface circuit (NIC) 108 provides connectivity to a network (not shown), thereby allowing the computer 100 to operate in a networked environment.

A memory 10 is also connected to the bus 106. The memory 112 stores a set of modules of executable instructions and data used to implement operations of the invention. In an embodiment, the memory 110 stores one or more of the following modules: an operating system module 112, a graphical user interface (GUI) module 114, a business intelligence (BI) module 116, a Visualization Object Model (VOM) module 118, a visualization engine module 120 for module 118, a repository with one or more pairs of visualization set metadata modules 122 and visualization set executable modules 124 (e.g., 122-A, 124-A, 122-B, 124-B), a plugin adapter module 126 and a summary metadata module 128.

The operating system module 112 may include instructions for handling various system services, such as file services or for performing hardware dependant tasks. The GUI module 114 may rely upon standard techniques to produce graphical components of a user interface, e.g., windows, icons, buttons, menu and the like, examples of which are discussed below. The BI module 116 includes executable instructions to perform BI related functions, such as, generate reports, perform queries and analyses, and the like. The BI module 116 includes executable instructions that create a BI application.

The visualization object model (VOM) includes executable instruction to interface visualization libraries and BI tools. In an embodiment, the executable instructions in the VOM module 118 are divided into a plurality of sub-modules. These sub-modules can include a visualization management (VM) sub-module providing a list of visualization libraries and their associated visualizations sets and a metadata description for each visualization in each set. These sub-modules can include a data passing sub-module that tells the BI applications using the VOM module how to pass data to a visualization. The VOM module 118 can include a data exchange sub-module. By providing metadata with a semantic description of the data, the module handles the incoming data. The VOM module 118 encloses the actual data within the data adaptor sub-module while additionally the module recognizes events and alerts instigated by the client application.

The VOM module 118 may include executable instructions for: visualization management, visualization settings, data feeds, data exchange, invoking a visualization library to render visualizations creating, deleting, modifying and aggregating metadata on visualizations, searching through metadata on visualizations, and the like. The VOM module 118 may include executable instructions to automatically determine if a visualization can be created based on specified data. The module 118 compares metadata for the data set to be rendered to the metadata for a visualization. By comparing the alignment of semantic descriptions (e.g., number of dimensions or measures) for the data set and the visualization, the VOM module 118 determines if a visualization can be created based on specified data. See the following pending, commonly owned patent application, which is incorporated by reference herein in its entirety: Ser. No. 11/478,836 filed Jun. 28, 2006, entitled "Apparatus and Method for Visualizing Data".

The repository includes one or more visualization set metadata modules 122, each paired with a visualization set executable module 124. The executable instructions in the visualization set executable module 124 render visualizations. A visualization set metadata module 122 describes its corresponding visualization set executable module 124. This description may include:

list of visualizations available
 output formats
 what kind of data the executable module consumes
 settings available for modification
 the way they support interaction
 their behavior in response to user interaction once created
 their response to scheduled or automated events.

The output formats may include bitmap, PNG, Flash, and the like. Settings may include: formatting, size, color, font, themes, placement, interactivity and the like. Data consumption may include how to accept data feeds, the number of axis per visualization, whether each axis is a dimension or a measure, and the like. The user interaction aspects of the metadata includes descriptions of visualization behavior up to selection and drill down of items in charts. Automated events include schedule processes, alerts, triggers and the like. The metadata can also include example visualizations, how to guides, and best charting practices (usability recommendations). The data file can include any of the following suitable features: be in human or machine-readable format; have the ability to represent text, graphics, data, code, and the like; have the ability to encode general computer science data structures, such as, records, lists, trees and the like; be a hierarchical structure; and be platform-independent.

The plugin adapter module 126 includes executable instructions to incorporate a visualization set executable module into the visualization model. This includes instructions to create visualization set metadata modules. The plugin adapter module 126 includes executable instructions to implement an interface for the BI tool overlying visualization set executable module, such that the BI tool will make calls by way of the VOM at rendering time. The plugin adapter module also has access to the VOM object model to retrieve the data and the settings to generate the output. The summary metadata modules includes instructions to aggregate, store and make available the metadata in the visualization set metadata modules of computer 100. This module can include instructions to search the summary metadata.

The executable modules stored in memory 110 are exemplary. Similarly, separate modules of executable code are not required. It should be appreciated that the functions of the modules may be combined. In addition, the functions of the modules need not be performed on a single machine. Instead, the functions may be distributed across a network, if desired. Indeed, the invention is commonly implemented in a client-server environment with various components being implemented at the client-side and/or the server-side. It is the functions of the invention that are significant, not where they are performed or the specific manner in which they are performed.

Figure 2:
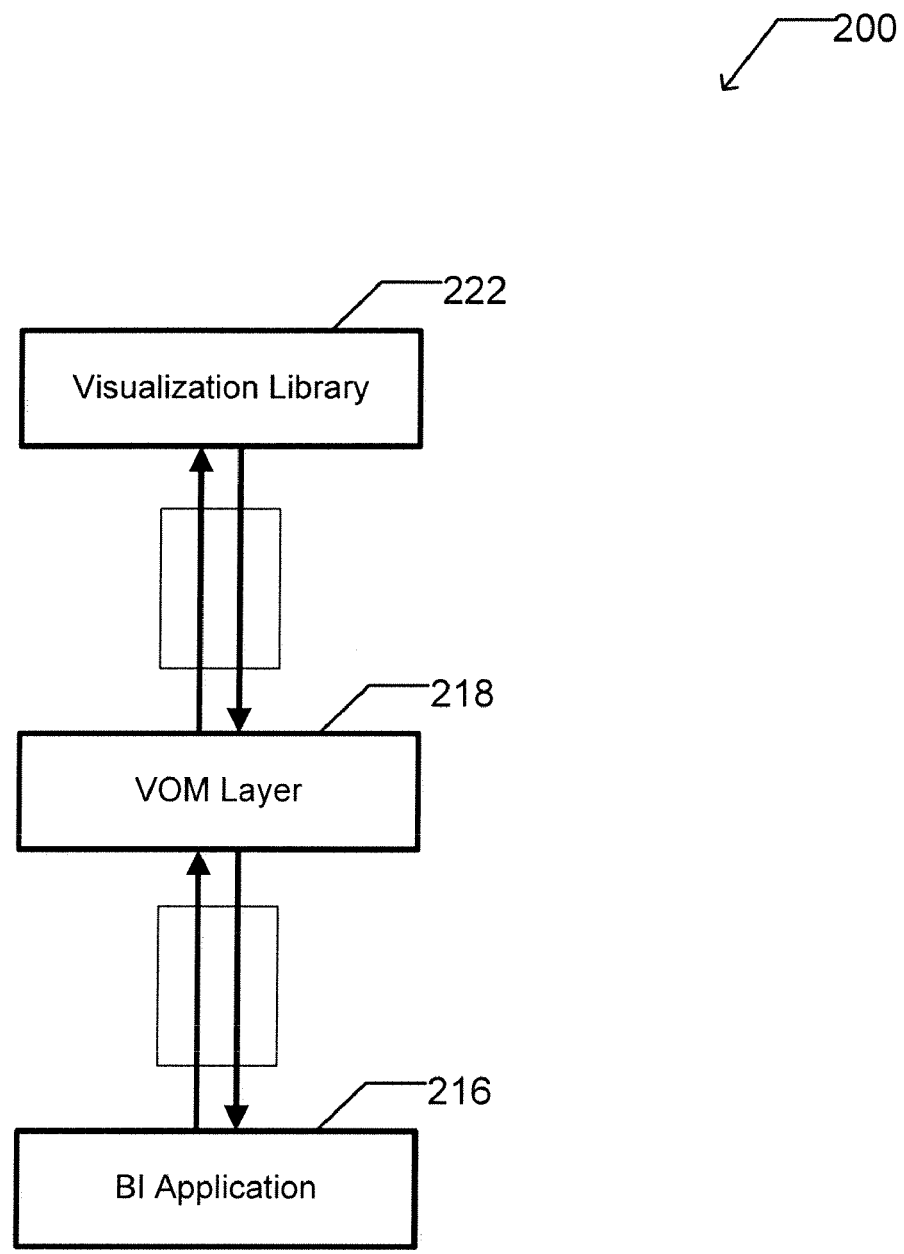
FIG. 2 illustrates how modules from FIG. 1 interrelate in accordance with an embodiment of the invention.

FIG. 2 illustrates an architecture 200 for an embodiment of the invention. The architecture shows how modules stored in memory 110 interrelate. There is a BI application 216 that is defined by executable instructions in the BI module 116. Included is a visualization library 222 defined by a visualization set executable module such as 122-A. Also included is an abstraction layer or VOM layer 218 defined by executable instructions in the visualization object model module 118. The VOM layer 218 is placed between the BI application 216 and the visualization library 222. The VOM layer 218 provides an application programmer interface for the BI application 216 to the visualization library 222.

The VOM layer 218 provides a common model and interface amongst visualization libraries and BI tools. Therefore, switching between libraries behind the VOM layer is easy. The VOM layer is open and extensible allowing further visualization libraries to be added. The VOM layer separates the BI application 216 and visualization library 222 with respect to the output types of the visualization created by the visualization library. This allows a visualization to be prepared on a first system and rendered on a second system.

The VOM layer 218 includes the ability to exchange visualization settings between the BI application 216 and the visualization library 222 through the VOM layer 218. In an embodiment, a visualization settings model is used. The visualization settings model describes a visualization that can be rendered by the visualization library 222. It includes a hierarchy, extending from a root of layers, regions, portions, properties, and the like. Each layer, region or portion has a set of modifiable properties. Each property has a value. The hierarchy of regions and properties are not fixed inside the VOM layer 218, instead they are declared in metadata to the visualization library 222. As well, data are exchanged between the BI application 216 and the visualization library 222. The data can have a data descriptor that characterizes the data. The data descriptor is created by the VOM layer 218. The data is mapped to the visualization. The setting model, data descriptor, and data can be stored in a text form, for example, in a hierarchical data file such as XML. Each visualization and its associated model, data descriptor, and data can be serialized—saved to storage for later use.

Figure 3:
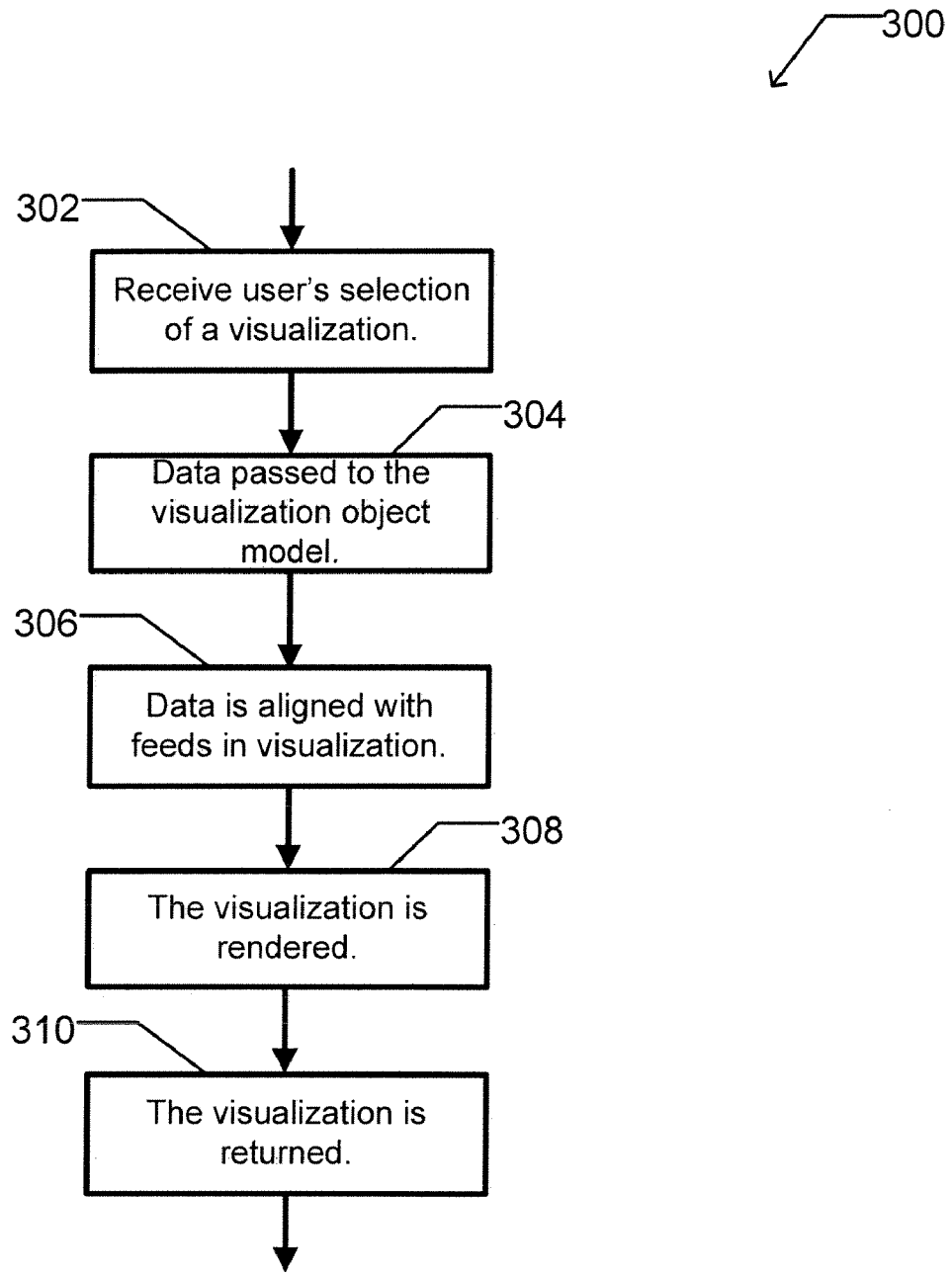
FIGS. 3 and 4 illustrate workflows for using a visualization engine in accordance with an embodiment of the invention.

FIG. 3 illustrates processing operations associated with an embodiment of the invention. Computer 100 receives a user's selection of a visualization 302. In operation 304, a data set is passed to the VOM module 118. The VOM module 118 aligns the data set with the visualization 306. In an embodiment, this is done using the executable instructions to automatically determine if a visualization could be created based on specified data of module 118. The corresponding visualization set executable module renders the visualization 308. The rendered visualization is returned 310.

The following pseudo code segment is an example of executable instructions to create processing operation set 300. The pseudo code segment is an object orientated example of creating a visualization in accordance with the invention.

| Code Segment A: Graph Driven Example |
|---|

```
AA  ...
AB  VisualizationEngine engine = VisualizationEngine.getInstance( )
AC  GraphicInstance gi = engine.getGraphicInstance("businessgraphics/vertical_bar")
AD  DimensionLabels dlCountry = new DimensionLabels("Country",
        DataType.STRING, DataStructure.SIMPLE)
AE  AnalysisAxis axisCountry = new AnalysisAxis( )
AF  axisCountry.addDimensionLabels(dlCountry)
AG  MeasureValues mv = new MeasureValues("Sales Revenue")
AH  DatasetDescriptor aDataset = new DatasetDescriptor( )
AI  aDataset.addAxis(axisCountry)
AJ  aDataset.addValues(mv)
AK  DataDescriptor dd = new DataDescriptor( )
AL  dd.addDatasetDescriptor(aDataset)
AM  gi.setDataDescriptor(dd)
AN  DataAdapter da = gi.getDataAdapter( )
AO  da.getDatasets( )[0].getAxisList( )[0].getDimensionLabelsList( )[0]
        .setData(new StringLabelData(new String[ ] { "France", "UK", "USA" }))
AP  da.getDatasets( )[0].getValueGroupList( )[0].getMeasure ValuesList( )[0]
        .setData(new DoubleValueData(new double[ ] { 100, 200, 89 }))
AQ  gi.getGraphic( ).getRegion("root/title").setPropertyValue("label", new
        VisuStrubg("Revenue per Locations"))
AR  RenderEngine re = gi.makeGraph(OutputType.PNG)
AS  return re.render( )
AT  ...
```

Figure 7:
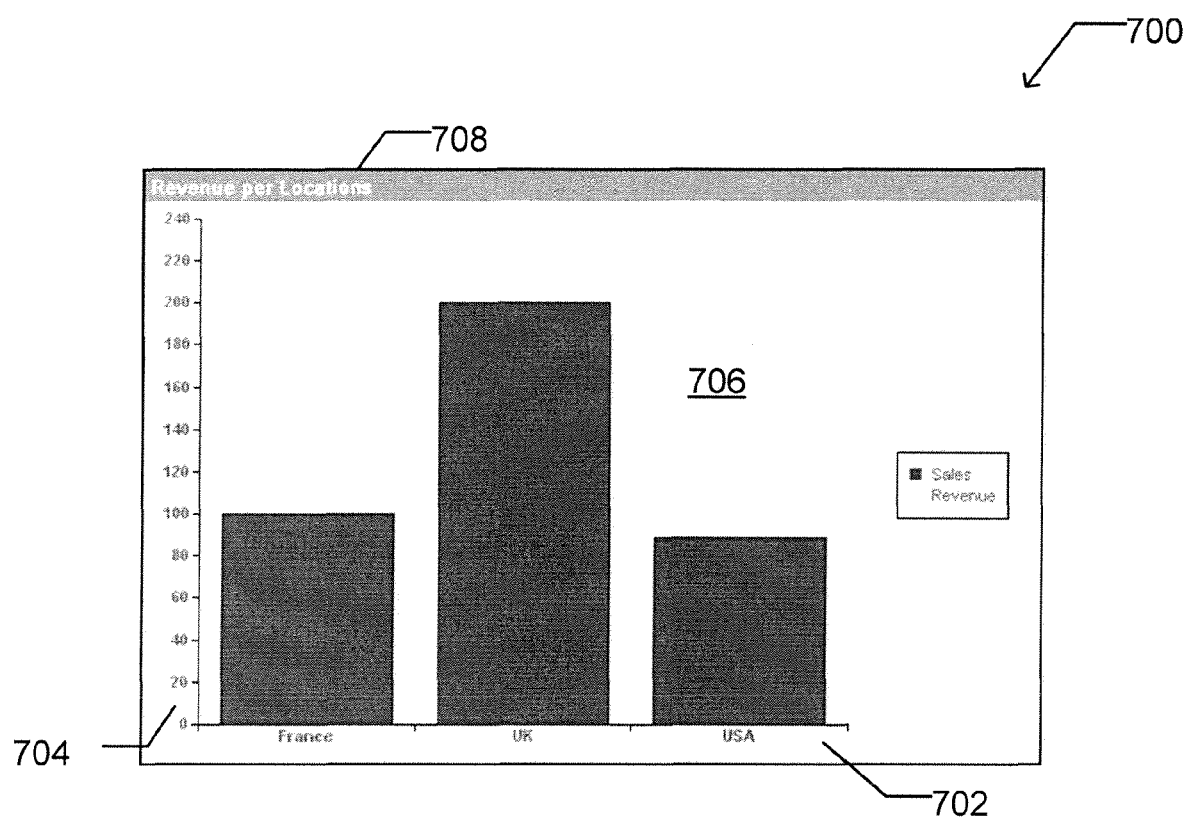
FIG. 7 illustrates an example of a visualization created by the workflow in FIG. 3 associated an embodiment of the invention.

In this segment of the pseudo code at lines AB and AC an instance of a visualization engine and a visualization are created. The result of the selection of the visualization (processing operation) is at line AC. The engine renders the visualization. The visualization holds data and settings. In lines AD-AN the metadata definition of the visualization is created. For example at lines AD-AF a first axis is created and assigned a dimension, specifically country. At line AF the label for the new axis is set. At line AG the measure "Sales Revenue" is created. In lines AI-AL the data descriptor including the dimension "Country" and measure "Sales Revenue" is created. This data descriptor is saved within the visualization at line AM. At lines AN-AP the data feeds are aligned with the visualization. On line AQ the title is set. At lines AR and AS the visualization is rendered and returned. These lines are an example of processing operation 308 and 310 of FIG. 3. FIG. 7 illustrates an example of a visualization created by the workflow in FIG. 3 and code segment A.

Figure 4:
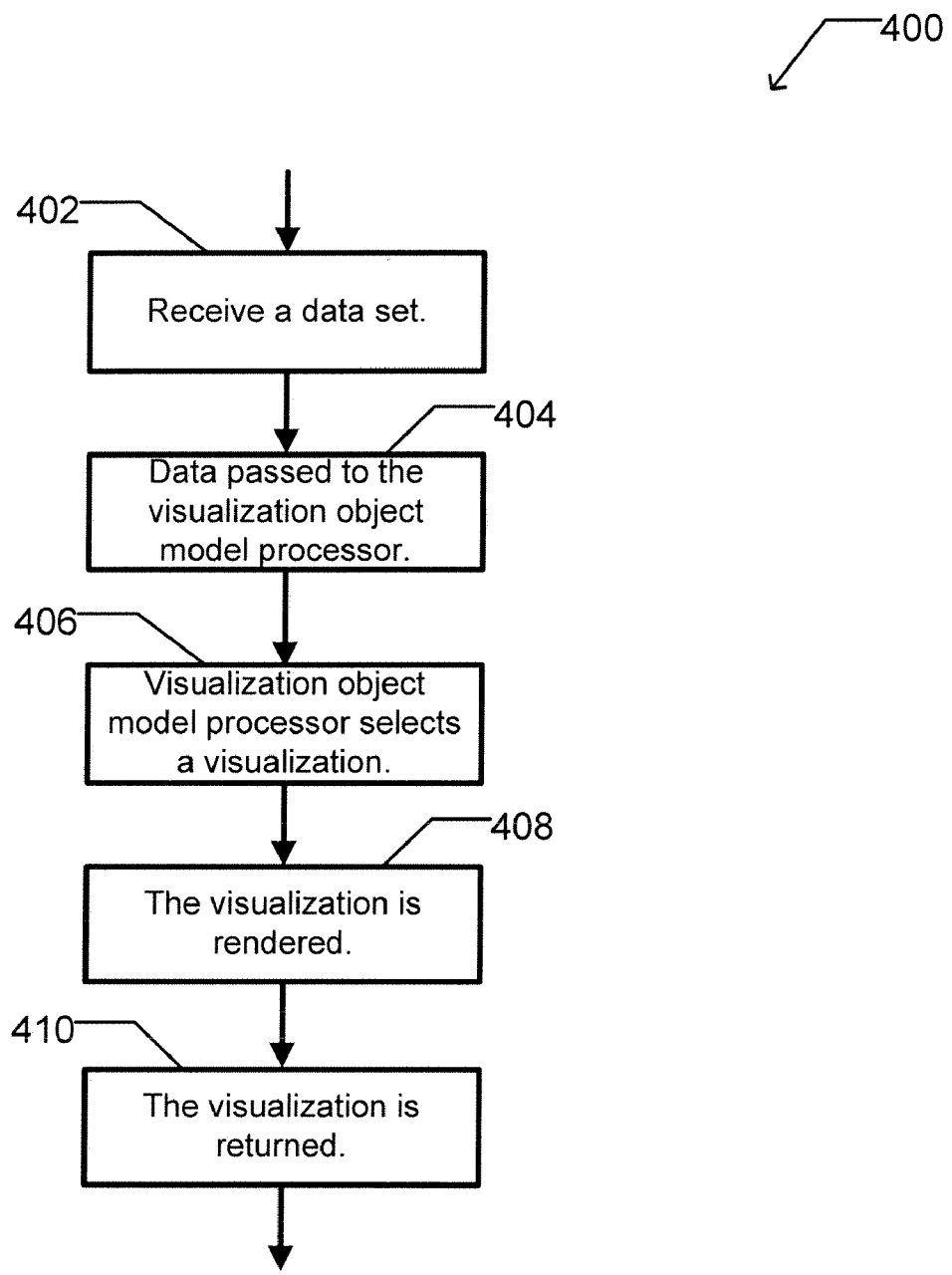

FIG. 4 illustrates processing operations associated with an embodiment of the invention. Computer 100 receives a data set 402. In operation 404, the data set is passed to the VOM module 118. The VOM module 118 selects a visualization based on aspects of the data set described by metadata to the data set 406. The visualization is rendered with the data from the data set 408. The visualization is returned 410. For example, the visualization is returned to the BI application defined by the execution of instructions in the BI module 116.

Figure 5:
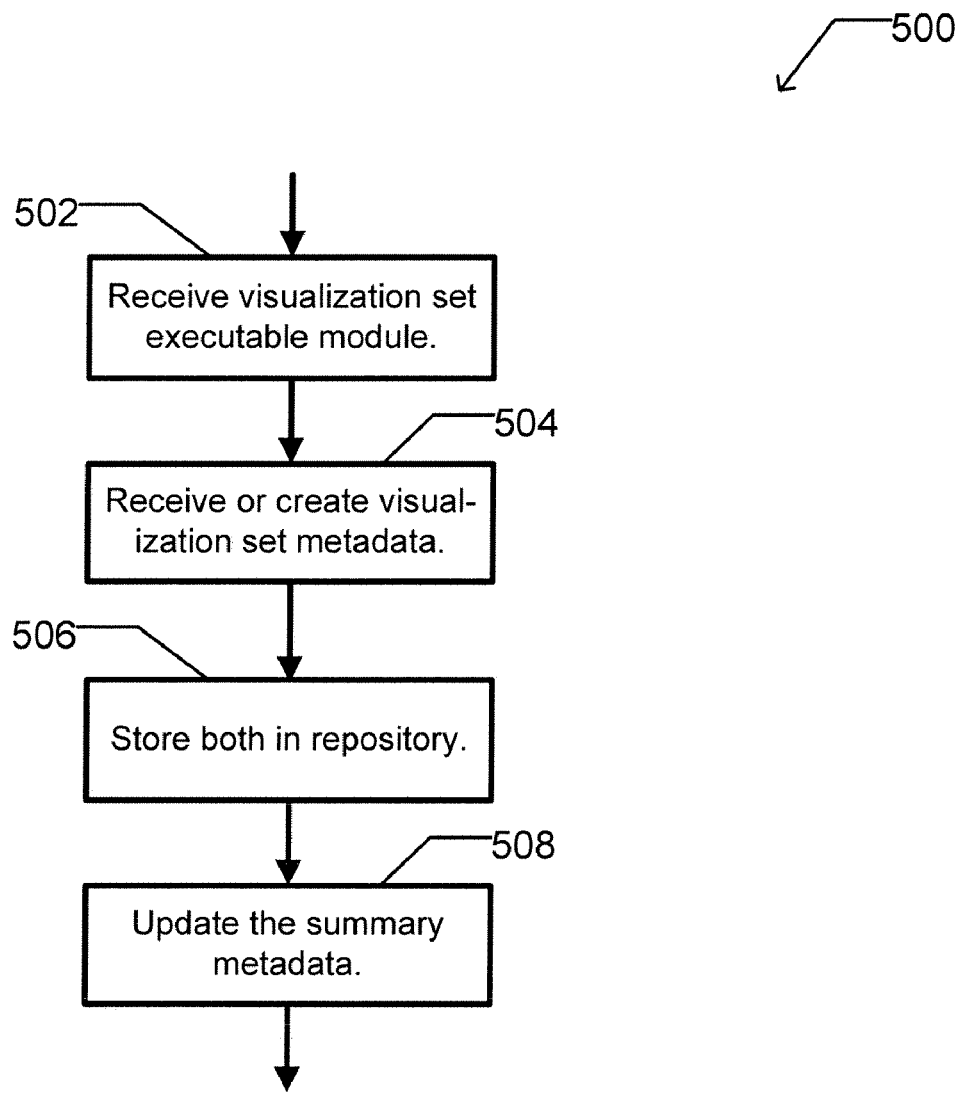
FIG. 5 illustrates the process of adding a visualization library to a visualization engine in accordance with an embodiment of the invention.
Figure 6:
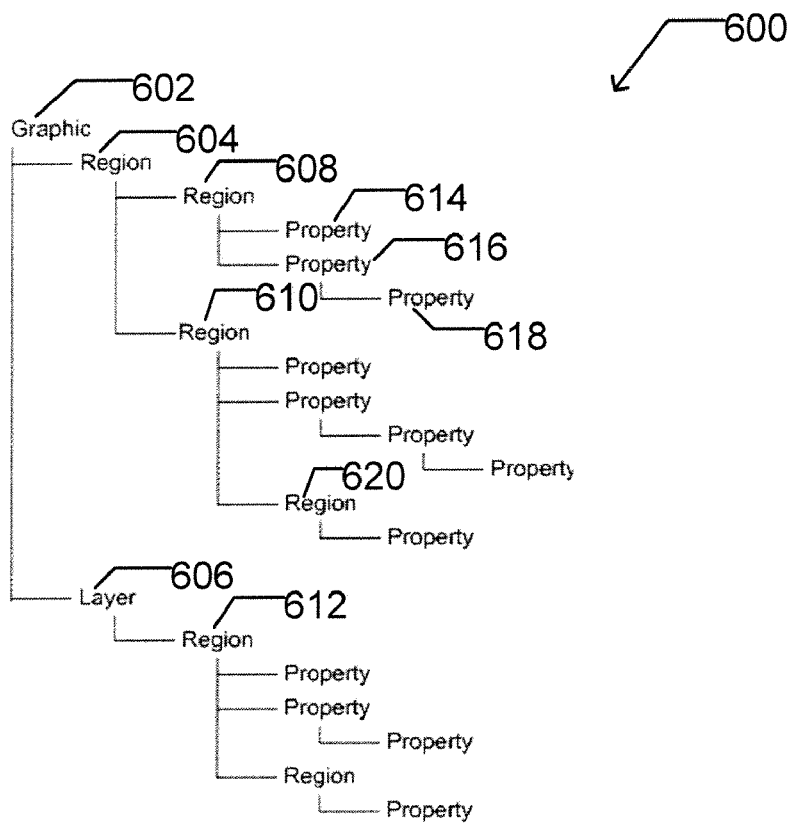
FIG. 6 illustrates a setting model for a visualization in accordance with an embodiment of the invention.

FIG. 5 illustrates processing operations for creating a visualization set metadata module in accordance with an embodiment of the invention. The computer 100 receives a visualization set executable module 502. For example the visualization set executable module is visualization set B executable module 122-B from FIG. 1. The visualization set metadata module for this executable module is created 504. In an embodiment, the metadata is received. The metadata is store as a metadata module that is stored along with the executable module 506. The summary metadata on all metadata modules is updated. In an embodiment, the summary metadata module 128 is updated. FIG. 6 illustrates a settings model 600 for a visualization in accordance with an embodiment of the invention. The settings model 600 is a hierarchy of the elements in a visualization. The settings model 600 includes a root element for the visualization 602. The root element is the visualization itself. An example is a line chart. Beneath the root element are regions (e.g., 604, 608, 610, 612, 620), layers (e.g., 606) and properties (e.g., 614, 616, 618). A region is a logical group of properties that represents a graphic element. An example of a region is the x-axis of a line chart. A layer is a type of graphic representation. An example of a layer is the line of a line chart. A layer is a section of the root element, it can be combined with other layers to create a graphic. A property is the child element of a root, layer or region element. An example of a property is the font used for the x-axis label of a line chart.

The setting model 600 allows for generic visualizations to present themselves to the BI tools in a structured but open ended way. The BI Tools of the BI module 116 can discover the contents of the setting model. In an embodiment, the contents are discovered by starting at the root and searching the entire model. In an embodiment, the settings module 600 adheres to a definition common to the VOM for all settings models and instances. The definition defines define the structure, content or semantics of a setting model. In another embodiment, the definition is common only to the instances of a particular setting model. The root, region and layer elements of a visualization can be in two forms: a static form where associated properties can be set at design time or a dynamic form where properties can be set after design time. For example, a region such as an axis can include the parameters "0" and "n" where "n" is a value dependent on factors outside of the setting model. The structure of a visualizations setting model can be extended by the creator of the visualization or the BI tool.

The setting model, data descriptor, mappings, other metadata and the data to visualization can be stored in hierarchical data files. Hierarchical data files store any set of data organized as a tree where parent child relationships exist between data elements, and where all possible parent child relationships can be expressed through a definition. An extensible Markup Language (XML) file is a common implementation of hierarchical data. Typically the Hierarchical data file is a flat text file that contains data elements and data properties where relationships between data elements are indicated within the text using markup, tags, and the like. XML and Standardized General Markup Languages (SGML) type languages are common examples of hierarchical file data. The definitions for these hierarchical data files can be recorded in definition files such as Document Type Definition (DTD) and XML Schema Definition (XSD) files. The definition files can act as a definition to the setting model. A Hierarchical Data Stream (HDS) is hierarchical data that is sequentially provided and consumed via a data stream. Dynamic data is a form of streaming data where data is streamed as further updates to the information become available. Static data is another form of streaming data where data is streamed based on a request for the data. A web service or RSS (Really Simple Syndication) feed would be typical examples of HDS.

This XML code could be defined by an XSD file acting as a definition to the setting model. The following code segment is XML code that can be used to define a settings model such as 600 from FIG. 6. This XML code could be defined by an XSD file acting as a definition to the setting model.

| Code Segment B: XML Code Segment for Setting Model |
| --- |
| BA  ... |
| BB  \<Graphic\> |
| BC    \<Property ... /\> |
| BD    \<Region\> |
| BE      \<Property\> |
| BF        \<Value\> ... \</Value\> |
| BG      \</Property\> |
| BH    \</Region\> |
| BI    \<Layer\> |
| BJ      \<DefaultValues\> |
| BK        \<DefaultValue ... /\> |
| BL      \</DefaultValues\> |
| BM      \<Colors .../\> |
| BN      \<CustomValues ... /\> |
| BO    \</Layer\> |
| BP  \</Graphic\> |
| BQ  ... |

In this segment of the XML code line BB specifies a graphic tag which is closed at line BP. The Graphic includes a Property at line BC, a Region at lines BD to BH and a Layer at lines BI to BO. The Region includes a Property with a Value at line BF. The Layer includes a series of Default Values at line BK and Custom Values at line BN. In an embodiment, the former is static content of the model and the later being dynamic.

FIG. 7 illustrates an example of a visualization 700 created by the workflow associated with an embodiment of the invention. The visualization 700 includes: an x-axis 702 with country labels, a y-axis 704 with a scale, a depiction of the data by a series of vertical bars 706 and a title 708. Each element of visualization 700 can be mapped to a processing operation in FIG. 4 and code segment A. The following connections between elements of visualization 700 and code segment A an be made.

x-axis 702 with country labels—line AD y-axis 704 with a scale—lines AG, AJ and AP depiction of the data by a series of vertical bars 706—line AC title 708—AQ.

The contents of a visualization can be saved to storage for later use. This saving or serialization can occur at any time during or after the visualization's definition process. This saved version of a visualization includes the data of the visualization, the metadata description of the visualization and a mapping from data to the visualization. In an embodiment, each of these is encoded in an XML file, respectively, the data, data descriptor, and mapping. The mapping provides a way for executable instructions in the VOM module to place data into a visualization.

The following code segment is an example of a data descriptor created by an embodiment of the invention. The data descriptor is for visualization 700 and should be read in conjunction with code segment A. This code segment is XML code.

| Code Segment C: Data Descriptor of Visualization 700 |
| --- |
| CA  ... |
| CB  \<DataDescriptor\> |
| CC    \<datasetDescriptor\> |
| CD      \<analysisAxis\> |
| CE        \<dimensionLabeisRef dataContainerId="0" /\> |
| CF      \</analysisAxis\> |
| CG      \<measureValues Name="Values 1"\> |
| CH        \<measureValuesRef dataContainer Id="1" /\> |
| CI      \<measure Values\> |
| CJ    \</datasetDescriptor\> |
| CK    \<dataContainer format="" title="Countryt" Id="0" xsi:type="DimLabels"\> |
| CL      \<dataType\>STRING\</dataType\> |
| CM      \<dataStructure\>SIMPLE\</dataStructure\> |
| CN    \</dataContainer\> |
| CO    \<dataContainer format="" title="Sales Revenue" Id="1" xsi:type="MeasureValues" aggregable="true"\> |
| CP    \</dataContainer\> |
| CQ  \</DataDescriptor\> |
| CR  ... |

In this segment of the XML code at lines CK, CL and CM are values set in line AD of code segment A. At lines CO are values set in line AG. Also included in code segment C are data container identification tags at lines CE and CH.

The following code segment is an example of data created by an embodiment of the invention. The data descriptor is for visualization 700 and should be read in conjunction with code segments A and C.

| Code Segment D: Data of Visualization 700 |
| --- |
| DA  ... |
| DB  \<Data\> |
| DC    \<datasetAdapter\> |
| DD      \<dimensionLabeisList dataContainerId="0" xsi:type="DimensionLabelsAdapter"\> |
| DE        ... |
| DF        \<data Type\>STRING\</dataType\> |
| DG        \<dataStructure\>SIMPLE\</dataStructure\> |
| DH        \<encodedvalues\>...\</encodedvalues\> |
| DI        ... |
| DJ      \</dimensionLabelsList\> |
| DK      \<measureValuesList dataContainerId="1" xsi:type="MeasureValuesAdapter"\> |
| DL        ... |
| DM        \<dataType\>DOUBLE\</dataType\> |
| DN        \<dataStructure\>SIMPLE\</dataStructure\> |
| DO        \<encodedvalues\>...\</encodedvalues\> |
| DP        ... |
| DQ      \</measure ValuesList\> |
| DR    \</datasetAdapter\> |
| DS  \</Data\> |
| DT  ... |

In this segment of the XML code at lines DH and DO the data for the visualization are stored. The types of the data are defined at lines DF, DG, DM and DN. Also included in code segment D are data identification tags at lines DD and DK. These can easily be mapped to the data container identification tags at lines CE and CH of code segment C.

Embodiments of the invention include a computer readable storage medium storing executable instructions. The computer readable storage medium includes instructions to receive a visualization library and a setting for a visualization. The visualization library renders an instance of the visualization according to the setting. That is the visualization is effected by changes in the setting's value. The executable instructions include instructions to convert the setting into a first piece of visualization library independent data. The instructions also receive a description of a region of the visualization and convert the description into a second piece of data. In an embodiment, the instructions also store the first piece of visualization library independent data and the second piece of visualization library independent data in metadata descriptive of the visualization. The metadata descriptive of the visualization can be included in the metadata descriptive of the visualization library. The instructions can update a set of summary metadata for a plurality of visualization libraries with the visualization library independent data. In an embodiment, the setting is part of a hierarchical settings model. In another embodiment, the setting is for the region in the visualization.

When introducing elements of embodiments of the invention, the articles "a", "an", "the" and "said" are intended to mean that there are one or more of the elements. The terms "comprising", "including" and "having" are intended to be inclusive and to mean that there may be additional elements other than the listed elements.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

While the present invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt to a particular situation, material, composition of matter, method, process step or steps, to the objective, spirit and scope of the present invention. All such modifications are intended to be within the scope of the claims appended hereto. In particular, while the methods disclosed herein have been described with reference to particular steps performed in a particular order, it will be understood that these steps may be combined, sub-divided, or re-ordered to form an equivalent method without departing from the teachings of the present invention. Accordingly, unless specifically indicated herein the order and grouping of the steps is not a limitation of the present invention.

What is claimed is:

1. A non-transitory computer readable storage medium, comprising executable instructions to:
   define a visualization object model layer disposed between a business intelligence application and a plurality of visualization libraries, wherein the visualization object model layer provides an application programmer interface for the business intelligence application to the plurality of visualization libraries;
   designate a visualization to be rendered;
   determine if the visualization can be created by comparing metadata for data to be rendered and metadata for the visualization;
   define a visualization settings model within the visualization object model layer, wherein the visualization settings model describes the visualization to be rendered by a visualization library in the plurality of visualization libraries;
   pass data from the business intelligence application to the visualization via the visualization object model layer to produce a rendered visualization;
   form a saved version of the visualization including data of the visualization, a metadata description of the visualization and a mapping from data to the visualization; and
   return the rendered visualization to the business intelligence application.

2. The computer-readable storage medium of claim 1 wherein the visualization settings model includes a hierarchy with a root and one or more elements selected from a layer, a region, a portion and a property.

3. The computer-readable storage medium of claim 2 wherein each element of the one or more elements has a modifiable value.

4. The computer-readable storage medium of claim 1 further comprising executable instructions to define a plurality of visualization setting models within the visualization object model layer, wherein each visualization setting model of the plurality of visualization setting models describes a representative visualization that can be rendered by a subset of visualization libraries in the plurality of visualization libraries.

5. The computer-readable storage medium of claim 1 wherein the visualization object model layer, the visualization library and the business intelligence application include executable instructions written in two or more programming languages.

6. The computer-readable storage medium of claim 1 further comprising executable instructions to pass a data feed from the business intelligence application to the visualization library through the visualization object model layer.

7. The computer-readable storage medium of claim 6 further comprising executable instructions to
   select the visualization library from the plurality of visualization libraries, wherein the visualization library is selected based on aspects of the data feed.

8. The computer-readable storage medium of claim 1 further comprising executable instructions to make a metadata description of the visualization library available to the business intelligence application.

9. The computer-readable storage medium of claim 1 further comprising executable instructions to define at least one of a data adapter object, a data descriptor object, a feeder object, and a graphic object.

10. The computer-readable storage medium of claim 1 further comprising executable instructions to maintain a data feed for rendering.

11. The computer-readable storage medium of claim 10 further comprising executable instructions to provide the visualization library a description of the data feed.

12. The computer-readable storage medium of claim 10 further comprising executable instructions to link the data feed to an instance of the visualization.

13. A non-transitory computer readable storage medium, comprising executable instructions to:
define a setting model for a visualization, a definition to the setting model, and a value for a setting in the setting model, wherein the setting model describes the visualization selected from a plurality of visualization libraries, wherein the setting model specifies a hierarchy of elements in the visualization and properties of the visualization, and wherein metadata for data to be rendered and metadata for the visualization are compared to confirm that the visualization can be created;
render an instance of the visualization incorporating the value for the setting via a visualization object model layer disposed between a business intelligence application and the plurality of visualization libraries, wherein the business intelligence application passes data to the visualization; and
return the rendered visualization to the business intelligence application via the visualization object model layer.

14. The computer-readable storage medium of claim 13 further comprising executable instructions to serialize the setting model for the visualization and the value for the setting.

15. The computer-readable storage medium of claim 13 further comprising executable instructions to create the setting model for the visualization and the value for the setting from a serialized object.

16. The computer-readable storage medium of claim 13 wherein the definition to the setting model places the setting model in a hierarchy.

17. The computer-readable storage medium of claim 16 wherein the setting model is one or more types selected from a root, a layer, a region, a portion, a property, and a further value.

18. Original The computer-readable storage medium of claim 13 wherein the visualization is of a type selected from a chart, map and table.

19. The computer-readable storage medium of claim 18 wherein the chart is of a type selected from status charts, variation charts, contribution comparison charts, rank compare charts, times series charts, frequency distribution charts, correlation charts, and combination charts.

20. The computer-readable storage medium of claim 13 further comprising executable instructions to define a plurality of visualization setting models.

21. The computer-readable storage medium of claim 13 comprising executable instructions selected from instructions to define the data consumption characteristics of the visualization, the reactions of the visualization to interaction, a list of visualizations available from a visualization library and the output formats from the visualization library.

22. The computer-readable storage medium of claim 13 wherein the setting mode or he visualization is included in a hierarchal data file 23. The computer-readable storage medium of claim 22 wherein:
the hierarchal data file is specified by a hierarchal data definition file; and
the definition to the setting definition is included in the hierarchal data definition file.

24. The computer-readable storage medium of claim 23 wherein the hierarchal data file is an extensible Markup Language (XML) file.

25. The computer-readable storage medium of claim 13, further comprising executable instructions selected from one or more executable instructions to: parse, modify, read and create one or more of: the setting model for the visualization, the definition to the setting model and the value for the setting.

* * * * *